United States Patent
Frank (10) Patent No.: US 11,396,324 B2
(45) Date of Patent: Jul. 26, 2022

(54) SELF-PROPELLED CONSTRUCTION MACHINE

(71) Applicant: Wirtgen GmbH, Windhagen (DE)

(72) Inventor: Burkhard Frank, Vettelschoß (DE)

(73) Assignee: Wirtgen GmbH

( * ) Notice: Subject to any disclaimer, the term of this patent is extended or adjusted under 35 U.S.C. 154(b) by 123 days.

(21) Appl. No.: 17/067,964

(22) Filed: Oct. 12, 2020

(65) Prior Publication Data
US 2021/0107559 A1 Apr. 15, 2021

(30) Foreign Application Priority Data
Oct. 15, 2019 (DE) ...................... 10 2019 127 735.3

(51) Int. Cl.
*B62D 5/32* (2006.01)
*B62D 5/093* (2006.01)
*E01C 23/088* (2006.01)

(52) U.S. Cl.
CPC ............... *B62D 5/32* (2013.01); *B62D 5/093* (2013.01); *E01C 23/088* (2013.01)

(58) Field of Classification Search
CPC .. B62D 5/07; B62D 5/32; B62D 5/093; E01C 23/088; B60T 13/686; B60T 17/02; B60T 13/662; B60T 13/22
USPC ......................................................... 180/403
See application file for complete search history.

(56) References Cited

U.S. PATENT DOCUMENTS

| 3,446,240 | A | * | 5/1969 | Schou | ................... | B60K 17/10 60/424 |
| 3,640,157 | A | * | 2/1972 | Schaefer | ............. | B62D 11/183 477/130 |
| RE28,944 | E | | 8/1976 | Ueda | | |
| 4,665,695 | A | * | 5/1987 | Rau | .......................... | B62D 5/07 180/441 |
| 10,604,177 | B2 | | 3/2020 | Christ et al. | | |
| 2008/0142291 | A1 | | 6/2008 | Rathke et al. | | |

FOREIGN PATENT DOCUMENTS

| CN | 2406096 Y | 11/2000 |
| CN | 2753785 Y | 1/2006 |
| DE | 102005025650 A1 | 12/2006 |
| DE | 102012022732 A1 | 5/2014 |
| DE | 102014107075 A1 | 11/2015 |
| DE | 102016002443 A1 | 8/2017 |
| JP | 2000289632 A | 10/2000 |
| KR | 1020170046357 A | 5/2017 |

OTHER PUBLICATIONS

China Office Action for parallel patent application No. 202011102040. 9, dated Dec. 16, 2021, 10 pages (not prior art).

* cited by examiner

*Primary Examiner* — Tony H Winner
*Assistant Examiner* — Felicia L. Brittman
(74) *Attorney, Agent, or Firm* — Lucian Wayne Beavers; Patterson Intellectual Property Law, PC (57) ABSTRACT

In the event of a malfunction in the supply of hydraulic fluid to the a braking device actuating device a hydraulic system has a manually actuated emergency-operation valve arrangement which is formed in such a way that, after the manual actuation thereof, a fluid connection is created between a steering device actuating device and the a pressure chamber of the braking device actuating device. The emergency-operation valve arrangement has a valve block in which flow paths are formed which can be shut off by means of shut-off screws.

15 Claims, 8 Drawing Sheets

SELF-PROPELLED CONSTRUCTION MACHINE

CROSS REFERENCES TO RELATED APPLICATIONS

This application claims priority to German patent application number 10 2019 127 735.3 filed Oct. 15, 2019, which is hereby incorporated by reference.

BACKGROUND OF THE INVENTION

1. Field of the Invention

The invention relates to a self-propelled construction machine, in particular a road milling machine, stabiliser, recycler or surface miner. These construction machines have a rotating work roller which can be a milling or cutting drum. By means of the work roller, damaged road layers can be removed, existing road surfaces can be reprocessed, the ground can be prepared for road construction or mineral resources can be mined, for example.

2. Description of the Prior Art

Self-propelled construction machines have a machine frame which is supported by a chassis comprising a plurality of running gears, for example crawler tracks or wheels. Construction machines with front, left and right running gears and rear, left and right running gears, relative to the working direction, are known. However, the construction machines can also have only one front and one left and one right rear running gear. In construction machines, at least one of the running gears is a steerable running gear. For example, in a small milling machine that has a front running gear and two rear running gears, the front running gear is a steerable running gear.

To steer the running gears, construction machines have a steering device comprising steering device actuating devices assigned to the steerable running gears of the construction machines, which act on the running gears in order to set the direction of travel of the running gears. For example, in a small milling machine having only one steerable running gear, the steering device has only one steering device actuating device, which can be a piston/cylinder arrangement having a double-acting hydraulic cylinder that adjusts the direction of travel of the running gear in one direction or the other.

The steering devices of construction machines are generally hydrostatic steering systems in which the actual steering forces are not applied by the vehicle driver but by a hydraulic pump driven by the vehicle's engine. The steering unit of hydraulic steering devices is also known as an orbitrol or servostat. Since the control element, for example the steering wheel, of an orbitrol generally functions as a manually operated hydraulic pump, the vehicle driver can still act upon the relevant pressure chamber of the hydraulic cylinder of the piston/cylinder arrangement of the steering device with hydraulic fluid by turning the steering wheel, even if the hydraulic pump fails so that the steering movement is carried out.

In addition, the known construction machines have a braking device comprising hydraulically actuated braking device actuating devices assigned to the running gears of the construction machines, with which, for example, brake shoes or brake discs (brake plates) can be actuated in order to brake the running gear and/or the construction machine.

The construction machine can have braking device actuating devices assigned to individual running gears or to all running gears.

The braking device actuating device comprises at least one pressure chamber which can be acted upon with a hydraulic fluid in order to move a brake shoe or brake disc (brake plate). If the pressure chamber is not acted upon with hydraulic fluid, the braking device actuating device is in a locking position, so that the brake is applied, and the running gear is braked. If, on the other hand, the pressure chamber of the braking device actuating device is acted upon with hydraulic fluid, the braking device actuating device assumes an operating position so that the brake is released, and the running gear is unbraked.

A hydraulic source, which has a hydraulic pump and a hydraulic tank, is provided to supply the steering device and the braking device.

In the event of a malfunction in the hydraulic system, for example, if the hydraulic pump fails, the braking device actuating device can no longer be actuated. As a result, the construction machine can no longer be moved. In this case, the known construction machines generally provide emergency operation.

SUMMARY OF THE INVENTION

The invention is based on the object of providing a reliably functioning emergency operation mode for a self-propelled construction machine with a relatively simple technical outlay, in which the braking device actuating device of the braking device can still be actuated, even in the case of a malfunction in the hydraulic system. In particular, it is an object of the invention to prevent accidental activation of the emergency operation mode.

This object is achieved according to the invention by the features in accordance with the independent claims. The subject matter of the dependent claims relates to preferred embodiments of the invention.

The self-propelled construction machine according to the invention has a braking device which comprises at least one hydraulically actuated braking device actuating device which has a pressure chamber that can be acted upon with a hydraulic fluid. A braking device actuating device can be provided for a running gear or a plurality of braking device actuating devices can be provided for a plurality of running gears, it being possible for a braking device actuating device to be assigned to each running gear.

The braking device actuating device is formed in such a way that, in a locking position, in which the pressure chamber of the braking device actuating device is not acted upon with hydraulic fluid, the running gear, to which the braking device actuating device is assigned, is braked, and in an operating position, in which the pressure chamber of the braking device actuating device is acted upon with hydraulic fluid, the running gear is unbraked.

In addition, the construction machine according to the invention has a hydrostatic steering device which comprises at least one steering device actuating device which has a first and a second pressure chamber that can be acted upon with a hydraulic fluid. A steering device actuating device can be provided for one or more running gears or a plurality of steering device actuating devices can be provided for a plurality of steerable running gears, it being possible for a braking device actuating device to be assigned to each steerable running gear.

The steering device is formed in such a way that, when steering in one direction, one pressure chamber of the steering device actuating device is acted upon with hydraulic fluid and, when steering in the other direction, the other pressure chamber of the steering device actuating device is acted upon with hydraulic fluid, so that the running gear to which the steering device actuating device is assigned executes a steering movement.

A hydraulic system is provided for the actuation of the at least one braking device actuating device and the at least one steering device actuating device, which hydraulic system has a hydraulic source for providing hydraulic fluid for supplying the steering device actuating device and the braking device actuating device with hydraulic fluid, wherein the hydraulic system is formed such that, in the operating position, the pressure chamber of the braking device actuating device is acted upon with hydraulic fluid, so that the brake is released and the running gear and/or the construction machine is unbraked. The hydraulic system may also be referred to as a hydraulic power supply system.

In the event of a malfunction in the supply of hydraulic fluid to the braking device actuating device, the hydraulic system has a manually actuated emergency-operation valve arrangement which is formed in such a way that, after the manual actuation thereof, a fluid connection is created between the steering device actuating device and the pressure chamber of the braking device actuating device. Consequently, during an actuation of the steering device actuating device, hydraulic fluid flows from the steering device actuating device into the pressure chamber of the braking device actuating device, so that the braking device assumes the operating position. The supply of hydraulic fluid to the braking device is therefore carried out by means of the hydrostatic steering device. Use is made of the special mode of operation of the known hydrostatic steering devices, which allows hydraulic fluid to be conveyed by manual actuation of a control element, for example by turning a steering wheel, even if the hydraulic pump fails. For example, a metering pump integrated into the hydrostatic steering device and functioning as a hand pump can be used to provide the hydraulic fluid.

The emergency-operation valve arrangement is further characterised in that the valve arrangement is formed by a valve block comprising a first inlet port which is in fluid connection with the hydraulic source, a second inlet port which is in fluid connection with one of the two pressure chambers of the steering device actuating device, and a work port which is in fluid connection with the pressure chamber of the braking device actuating device. In the valve block, a first flow path connecting the first inlet port to the work port is formed, which can be shut off by a first shut-off screw, and a second flow path connecting the second inlet port to the work port is formed, which can be shut off by a second shut-off screw. By turning the shut-off screws, one or the other flow path can be opened or closed, and an operating position or emergency operation can be specified.

The valve block having the shut-off screws forms a compact unit without complex mechanics that works reliably. In addition, the specification of emergency operation requires the use of tools in order to be able to turn the shut-off screws. Unintentional setting of the emergency operation mode, in which the vehicle driver, for example, accidentally actuates a freely accessible adjusting lever, is therefore excluded.

The first and/or second shut-off screw can have a screw head with a driving profile, in particular a polygonal socket, for example a hexagon socket, so that an adjustment of the shut-off screw is only possible with an Allen key. To secure the first and/or second shut-off screw, the screw head thereof can have an external thread so that a lock nut can be screwed onto the shut-off screw. The first and second shut-off screws are preferably screwed into bores of the valve block which are provided with an internal thread and which can be arranged next to one another on one side of the valve block. This means that the shut-off screws are easily accessible from one side.

One embodiment provides that the steering device actuating device has a piston/cylinder arrangement with a double-acting hydraulic cylinder, the second inlet port of the emergency-operation valve arrangement being in fluid connection with one of the two pressure chambers. However, a plurality of double-acting hydraulic cylinders can also be provided. Instead of a double-acting hydraulic cylinder, two single-acting hydraulic cylinders can also be provided.

A backflow of hydraulic fluid from the braking device into the steering device during an actuation of the braking device can be prevented in that the second inlet port of the emergency-operation valve arrangement is connected to one of the two pressure chambers of the steering device actuating device via a flow path in which a non-return valve is provided, which valve is opened in the direction of the second inlet of the emergency-operation valve arrangement.

Another embodiment provides that the hydraulic system has a multi-way valve with a first and a second switch position, the hydraulic system being formed in such a way that the pressure chamber of the braking device actuating device is not acted upon with hydraulic fluid in the first switch position so that the running gear is braked, and is acted upon with hydraulic fluid in the second switch position so that the running gear is unbraked. The multi-way valve is preferably preloaded into the first switch position so that the running gear and/or the construction machine can only be moved when the brake is actively released (locking brake). The multi-way valve is preferably an electromagnetically controlled multi-way valve which can be activated by the control unit of the construction machine.

Another embodiment provides that the emergency-operation valve arrangement and the multi-way valve form a structural unit comprising the valve block. A particularly compact and simple structure is achieved in this way.

The hydraulic source can comprise a hydraulic pump having a pressure port and a suction port and a hydraulic fluid tank, wherein the suction port of the hydraulic pump is in fluid connection with the hydraulic fluid tank, and the pressure port of the hydraulic pump is in fluid connection with an inlet of the steering device and an outlet of the steering device is in fluid connection with the hydraulic fluid tank.

The multi-way valve can be a 3-port/2-position valve having an inlet port and an outlet port and a work port, wherein the inlet port of the multi-way valve is in fluid connection with the pressure port of the hydraulic pump, and the outlet port of the multi-way valve is in fluid connection with the hydraulic fluid tank, and the work port of the multi-way valve is in fluid connection with the first inlet port of the emergency-operation valve arrangement.

If the multi-way valve and the emergency-operation valve arrangement have a common valve block, the work port of the multi-way valve and the first inlet port of the emergency-operation valve arrangement can be directly connected to one another via a channel in the valve block. This eliminates the need for additional hydraulic lines.

The self-propelled construction machine can be, for example, a road milling machine, a stabiliser, a recycler or a surface miner. A particular application is a road milling machine, in particular a small milling machine, which is characterised by a front running gear in the working direction and a rear left running gear and a rear right running gear, the front running gear being a steerable running gear. The running gears can be wheels. In such a small milling machine, a steering device actuating device can be assigned to the front running gear and a first braking device actuating device can be assigned to the rear left running gear, in particular a wheel, and a second braking device actuating device can be assigned to the rear right running gear, in particular a wheel.

DETAILED DESCRIPTION

Figure 1:
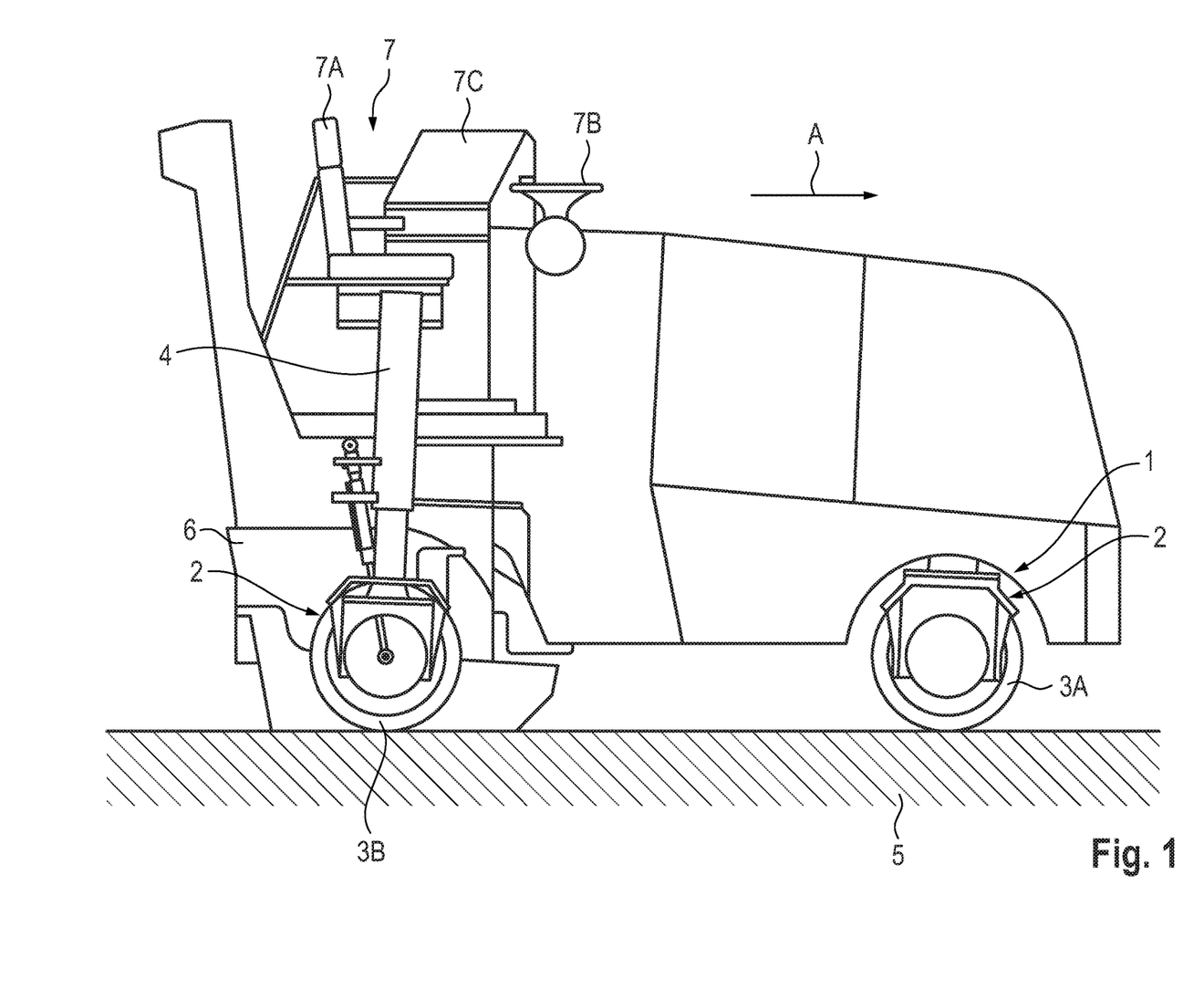
FIG. 1 is a lateral view of a small milling machine as an example of a self-propelled construction machine according to the invention.

FIG. 1 is a lateral view of a road milling machine as an example of a self-propelled construction machine. The road milling machine is a small milling machine. The construction machine has a machine frame 1 which is supported by a chassis 2. The chassis 2 has a steerable, front running gear 3A, in particular a wheel, and two non-steerable, rear running gears, in particular wheels. In FIG. 1, only the rear running gear 3B which is on the right in the working direction A can be seen. In known construction machines, the chassis can also have crawler tracks instead of wheels. The machine frame 1 of the construction machine can be adjusted in height relative to the surface of the ground 5 on lifting columns 4.

The construction machine has a work roller which is a milling drum. The milling drum, which cannot be seen in FIG. 1, is arranged on the machine frame 1 in a milling drum housing 6. The driver platform 7 comprising a driver's seat 7A, a steering wheel 7B and a control panel 7C is located above the milling drum housing 6.

The construction machine has a hydrostatic steering device 9, which is characterised in that the actual steering forces are not applied by the vehicle driver, but rather by a hydraulic pump driven by the engine of the construction machine. When the operator turns the steering wheel in one direction or the other, the direction of travel of the front running gear 3A changes. The hydrostatic steering device 9 may also be referred to as a hydrostatic steering system 9.

In addition, the construction machine has a hydraulic braking device 8, which allows for an emergency operation. The hydraulic braking device is described in detail below together with the steering device. The braking device 8 may also be referred to as a braking system 8.

Figure 2:
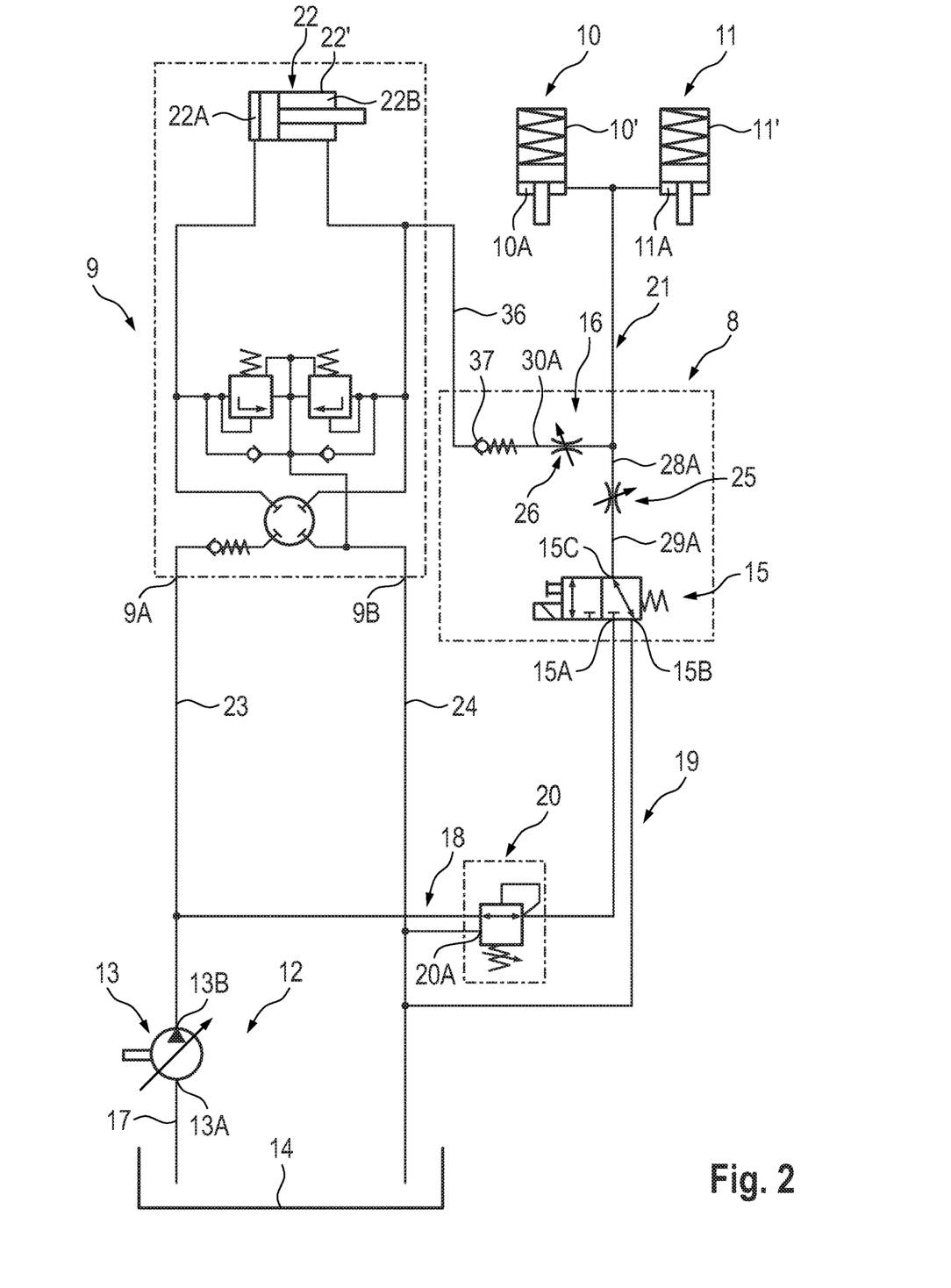
FIG. 2 is the hydraulic circuit diagram of the steering device and the braking device of the self-propelled construction machine.

FIG. 2 shows the hydraulic circuit diagram of the braking device 8 together with the steering device 9. The braking device 8 has a first braking device actuating device 10 for the rear left running gear and a second braking device actuating device 11 for the rear right running gear. In the present embodiment, the braking device actuating devices 10, 11 have piston/cylinder arrangements 10', 11', the pistons of which interact, for example, with a brake shoe or brake disc (plate) of the brake. The piston is preloaded into a position in which the brake is applied. When the pressure chamber 10A, 11A of the first and second piston/cylinder arrangements 10', 11' is acted upon with hydraulic fluid, the brakes of the rear running gears are released. The braking device actuating devices 10, 11 may also be referred to as braking actuators 10, 11.

The hydraulic fluid for the braking device 8 is provided by a hydraulic source 12, which comprises a hydraulic pump 13 and a hydraulic fluid tank 14.

In addition, the braking device 8 has an electromagnetically controlled multi-way valve 15 and an emergency-operation valve arrangement 16 which is operated by hand.

The multi-way valve 15 is a 3-port/2-position multi-way valve having a first and a second switch position and an inlet port 15A and an outlet port 15B and a work port 15C. The multi-way valve 15 is preloaded into the first switch position in which the inlet port 15A is blocked and the outlet port 15B is connected to the work port 15C. In the second switch position, the inlet port 15A is connected to the work port 15C, wherein the outlet port 15B is blocked.

The suction port 13A of the hydraulic pump 13 is connected to the hydraulic fluid tank 14 via a hydraulic line 17, and the pressure port 13B of the hydraulic pump 13 is connected to the inlet port 15A of the multi-way valve 15 via an inlet hydraulic line 18. The outlet port 15B of the multi-way valve 15 is connected to the hydraulic fluid tank 14 via an outlet hydraulic line 19. An adjustable pressure regulating valve 20 having a discharge opening 20A, which is in fluid connection with the outlet hydraulic line 19, is connected into the inlet hydraulic line 18.

The work port 15C of the multi-way valve 15 is in fluid connection with the pressure chambers 10A, 11A of the first and second braking device actuating devices 10, 11 via a flow path 21. If the multi-way valve 15 is not activated and is in the first switch position, the pressure chambers 10A, 11A of the first and second braking device actuating devices 10, 11 are not acted upon with hydraulic fluid, so that the actuating devices are in a locking position in which the brakes are applied. If, on the other hand, the pressure chambers are acted upon with hydraulic fluid in the second switch position of the multi-way valve, the actuating devices are in an operating position so that the brakes are released.

In the event of a malfunction in the hydraulics, for example if the hydraulic pump 13 fails, the braking device actuating devices 10, 11 can no longer be acted upon with hydraulic fluid in order to release the brakes. In this case, the braking device 8 allows for an emergency operation.

For emergency operation, the emergency-operation valve arrangement 16 is provided, which interacts with the hydrostatic steering device 9 of the construction machine. The steering device 9 has a steering device actuating device 22 which, in the present embodiment, has a piston/cylinder arrangement 22' assigned to the front steerable running gear 3A with a double-acting hydraulic cylinder, which has a first pressure chamber 22A on the piston side and a second pressure chamber 22B on the rod side. The steering device 9 has an inlet 9A and an outlet 9B, the inlet 9A being connected to the pressure port 13B of the hydraulic pump 13 via an inlet line 23 and the outlet 9B being connected to the hydraulic fluid tank 14 via an outlet line 24, so that the steering device 9 can be provided with hydraulic fluid. The steering device 9 also has further components, of which individual components are shown in FIG. 2. However, since these components belong to the prior art, a further description is dispensed with. The steering device actuating device 22 may also be referred to as a steering actuator 22.

The steering device 9 provides an emergency function so that the vehicle driver can steer the construction machine by turning the steering wheel 7B, even if the hydraulic pump 13 fails (FIG. 1). When the vehicle driver turns the steering wheel 7B in one direction, for example clockwise, hydraulic fluid is pumped into one of the two pressure chambers 22A, 22B of the piston/cylinder arrangement 22', for example into the rod-side pressure chamber 22B, whereby the piston is retracted. The hydraulic fluid can then flow out of the other pressure chamber, for example the piston-side pressure chamber 22A, into the hydraulic fluid tank 14.

The emergency-operation valve arrangement 16 is described in detail below. The emergency-operation valve arrangement 16 comprises two shut-off elements 25, 26, which are shown in the hydraulic circuit diagram as a first throttle valve and a second throttle valve, which valves have an adjustable cross section. The cross section can also be constant. For the emergency-operation valve arrangement 16 to function, it is sufficient if the two flow paths can be shut off and/or opened independently of one another.

Figure 3A:
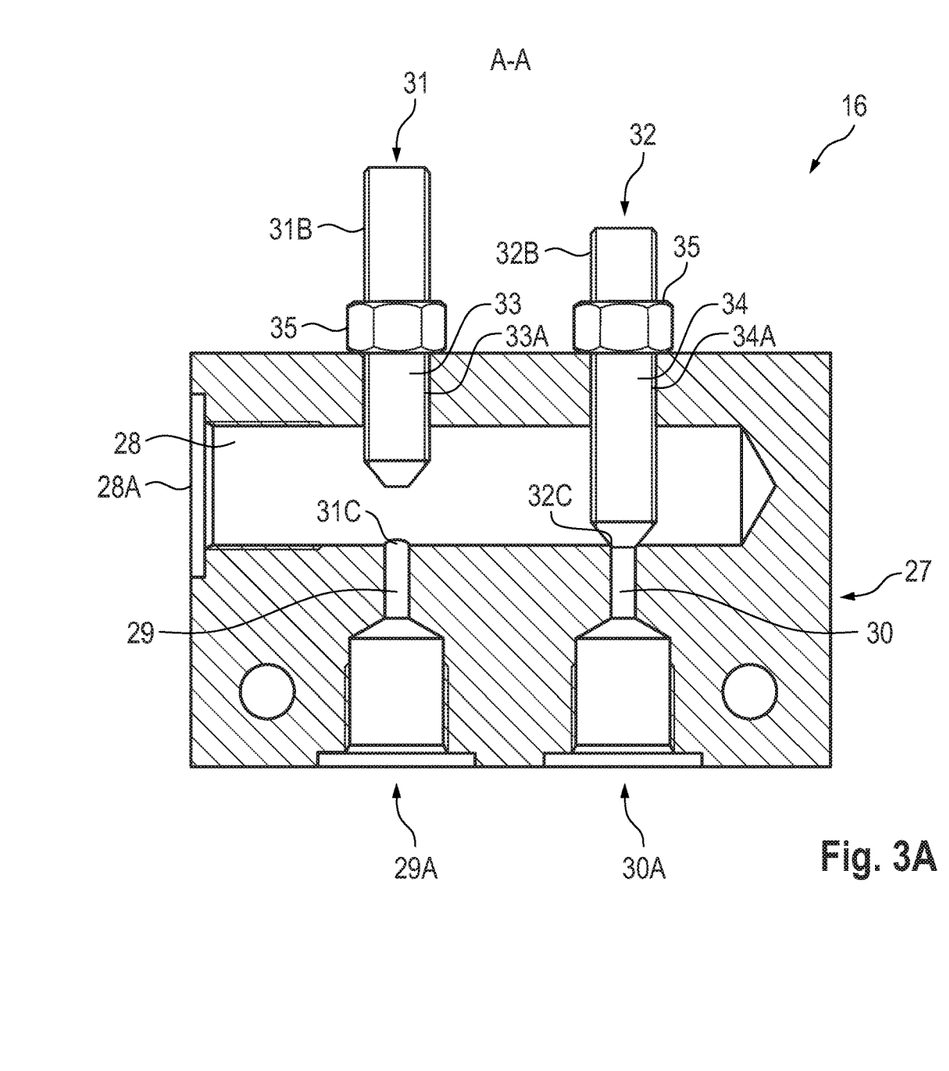
FIG. 3A is a view of the valve block of the emergency-operation valve arrangement of the braking device, the emergency-operation valve arrangement being in the operating position.
Figure 3B:
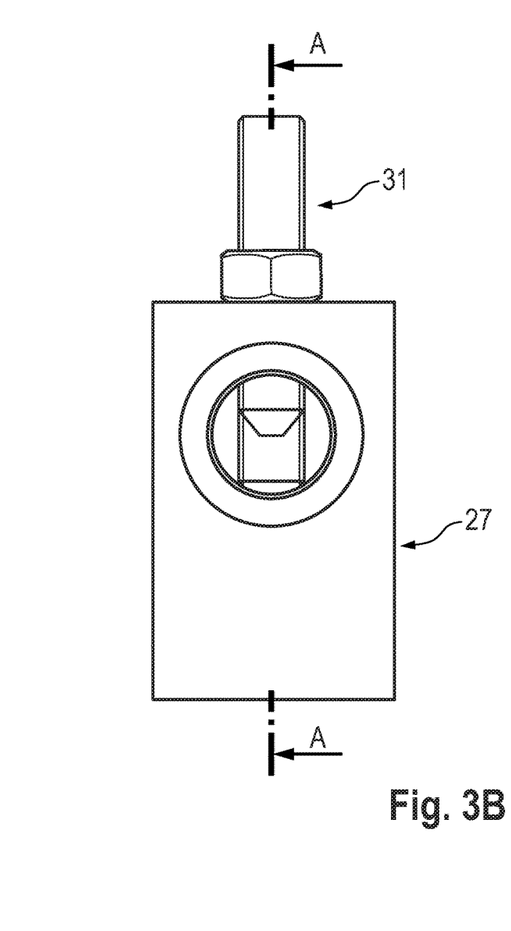
FIG. 3B is a section through the emergency-operation valve arrangement of FIG. 3A.
Figure 4A:
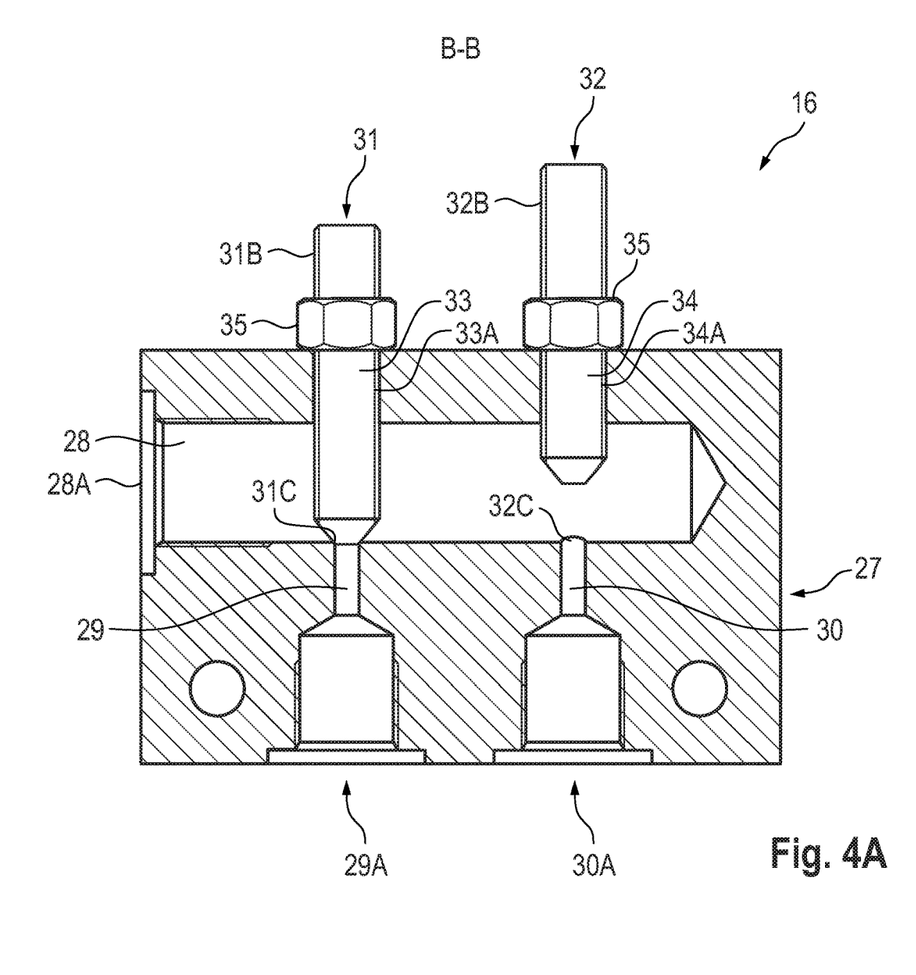
FIG. 4A is a view of the valve block of the emergency-operation valve arrangement of the braking device, the emergency-operation valve arrangement being in the emergency-operation position.
Figure 4B:
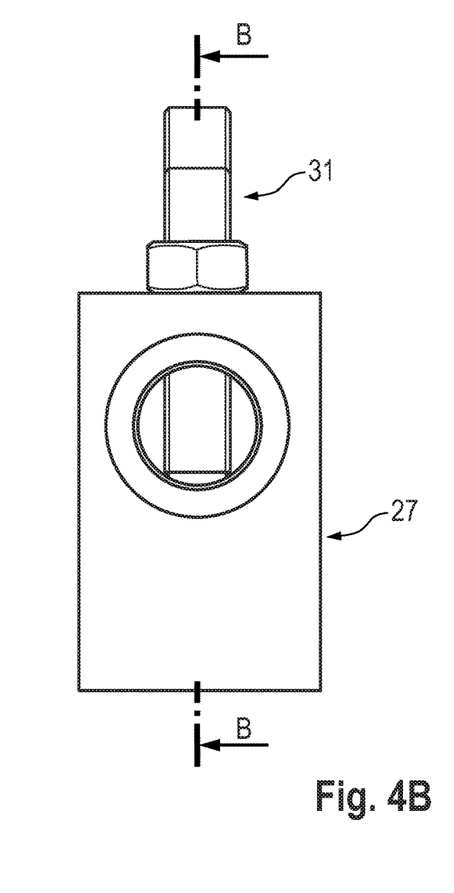
FIG. 4B is a section through the emergency-operation valve arrangement of FIG. 4A.
Figure 5:
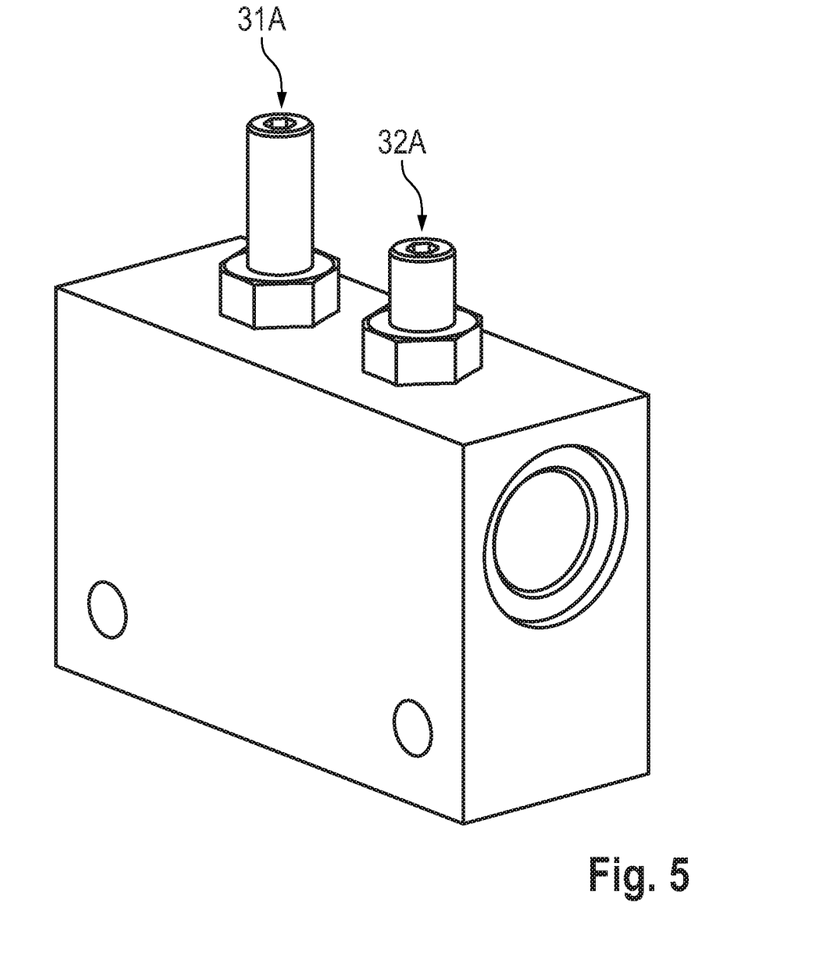
FIG. 5 is a perspective representation of the emergency-operation valve arrangement of FIG. 3A to 4B.

FIGS. 3A and 3B show a first embodiment of the emergency-operation valve arrangement 16 in a first switch position and FIGS. 4A and 4B show the emergency-operation valve arrangement in a second switch position. FIG. 5 is a perspective representation of the emergency-operation valve arrangement. The corresponding parts of FIG. 3 and FIG. 3A to 4B are provided with the same reference signs.

The emergency-operation valve arrangement 16 has a valve block 27 in which a central channel 28 having a work port 28A is formed, for example on the end face of the valve block. From the central channel 28, a first inlet channel 29 branches off with a first inlet port 29A, and a second inlet channel 30 branches off with a second inlet port 30A. The first and second inlet ports 29A, 30A can be provided next to one another on a longitudinal side of the valve block. To shut off the first inlet channel 29, a first shut-off screw 31 can be provided as the shut-off element 25, and to shut off the second inlet channel 30, a second shut-off screw 32 can be provided as the shut-off element 25. The shut-off screws 31, 32, which are screwed into bores 33, 34 having an internal thread 33A, 34A, have a screw head having a driving profile 31A, 32A, in particular a polygonal socket, preferably a hexagon socket for an Allen key (FIG. 5). The screw head of the shut-off screws 31, 32 is provided with an external thread 31B, 32B, a lock nut 35 being screwed onto the shut-off screws.

The work port 15C of the multi-way valve 15 is in fluid connection with the first inlet port 29A of the emergency-operation valve arrangement 16 via a flow path, while the work port 28A of the emergency-operation valve arrangement 16 is in fluid connection with the two pressure chambers 10A, 10B of the braking device actuating devices 10, 11 via the flow path 21.

The second inlet port 30A of the emergency-operation valve arrangement 16 is in fluid connection with the rod-side pressure chamber 22B of the piston/cylinder arrangement 22' of the steering device 9 via a flow path that includes a bypass hydraulic line 36 leading to the steering device. A non-return valve 37 is connected into the bypass hydraulic line 36 and opens when hydraulic fluid flows from the rod-side pressure chamber 22B of the piston/cylinder arrangement 22 to the emergency-operation valve arrangement 16. Otherwise, the non-return valve 37 is closed.

In the operating position, the first shut-off screw 31 is not seated on the first valve seat 31C, which is formed in the valve block 27, while the second shut-off screw 32 is seated on the second valve seat 32C, which is formed in the valve block. Consequently, the hydraulic pump 13 can deliver hydraulic fluid into the pressure chambers 10A, 10B of the braking device actuating devices 10, 11 when the multi-way valve 15 is switched to the second switch position, so that the brakes are released. The bypass hydraulic line 36, on the other hand, is shut off by the non-return valve 37 so that the function of the braking device actuating device is not disturbed by the steering device 9.

It is assumed that the hydraulic pump 13 has failed. It is then possible to switch to emergency operation. This can only be done if the lock nuts 35 of the first and second shut-off elements 31, 32 are released with an open-end wrench and the first shut-off screw 31 is screwed into the valve block 27 and the second shut-off screw 32 is screwed out of the valve block with an Allen key, so that the first inlet channel 29 is shut off and the second inlet channel 30 is opened (FIGS. 4A and 4B). Of course, the second shut-off screw 32 must not be completely unscrewed from the valve block 27, but only so far until an oil flow is ensured. If the vehicle driver now turns the steering wheel 7B, after failure of the hydraulic pump 13, the steering device 9 delivers hydraulic fluid in the emergency function into one of the two pressure chambers of the piston/cylinder arrangement 22', for example into the rod-side pressure chamber 22B, while hydraulic fluid from the piston-side pressure chamber 22A flows out into the hydraulic fluid tank 14. As a result, the piston of the piston/cylinder arrangement 22' is retracted, as a result of which the steerable running gear 3A rotates in the corresponding direction until it has reached its mechanical stop. If the vehicle driver continues to turn the steering wheel 7B, hydraulic fluid can flow to the second inlet port 30A of the emergency-operation valve arrangement 16 via the bypass hydraulic line 36 and can then flow from the work port 28A of the emergency-operation valve arrangement 16 to the pressure chambers 10A, 11A of the braking device actuating devices 10, 11, whereby the brakes are released.

Figure 6A:
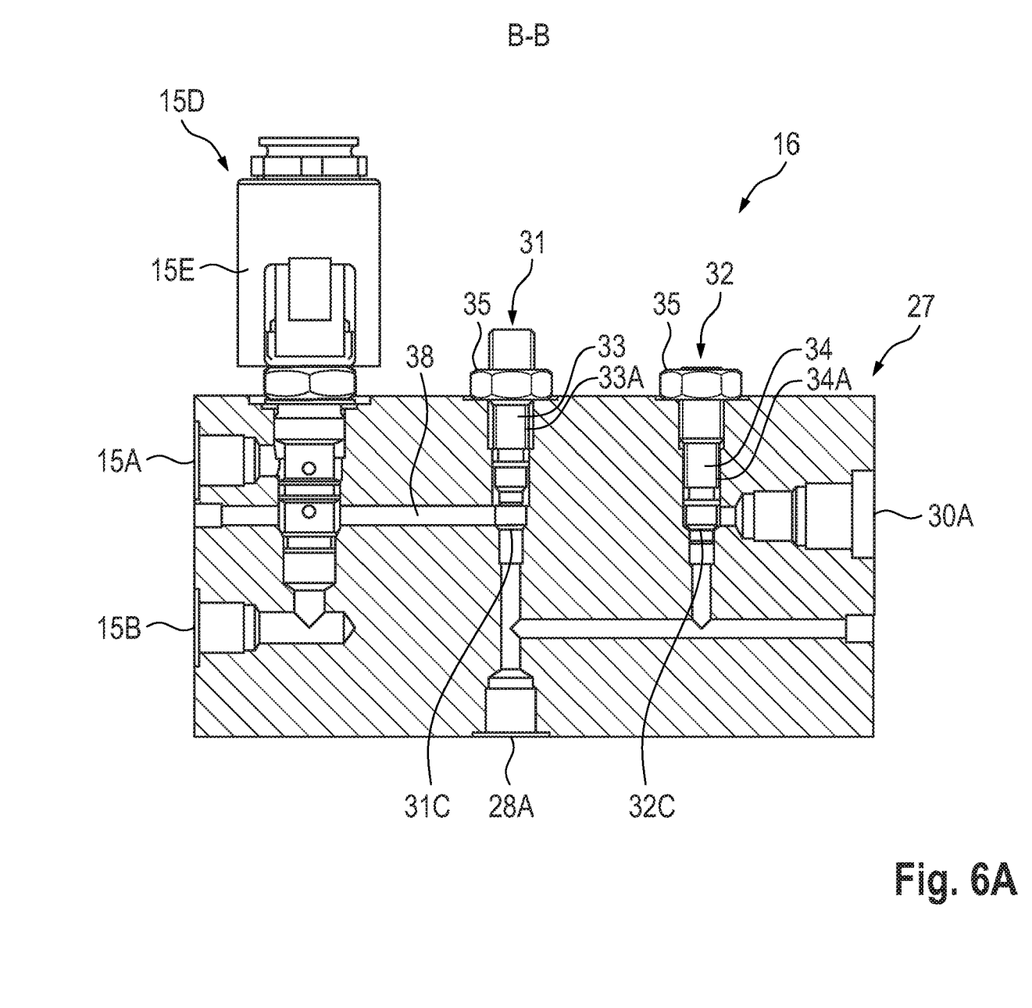
FIG. 6A shows an embodiment in which the multi-way valve and the emergency-operation valve arrangement of the braking device form a structural unit, the emergency-operation valve arrangement being in the operating position.
Figure 6B:
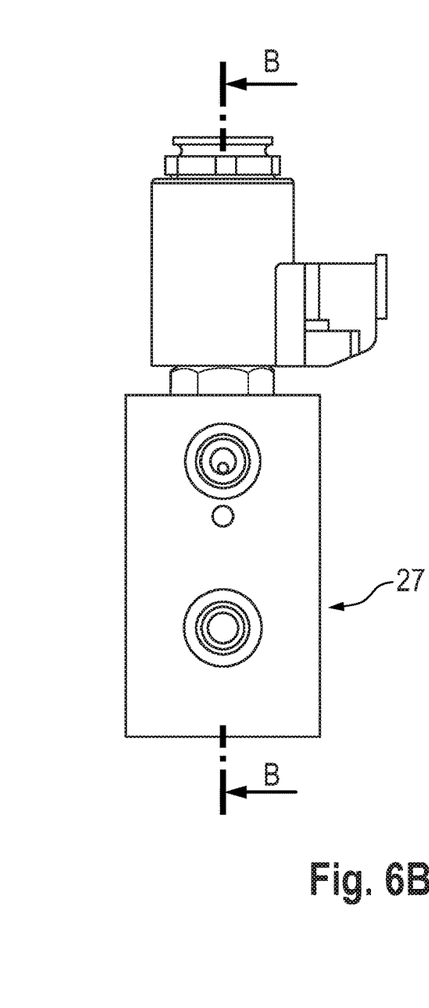
FIG. 6B is a lateral view of the structural unit of FIG. 6A.
Figure 7A:
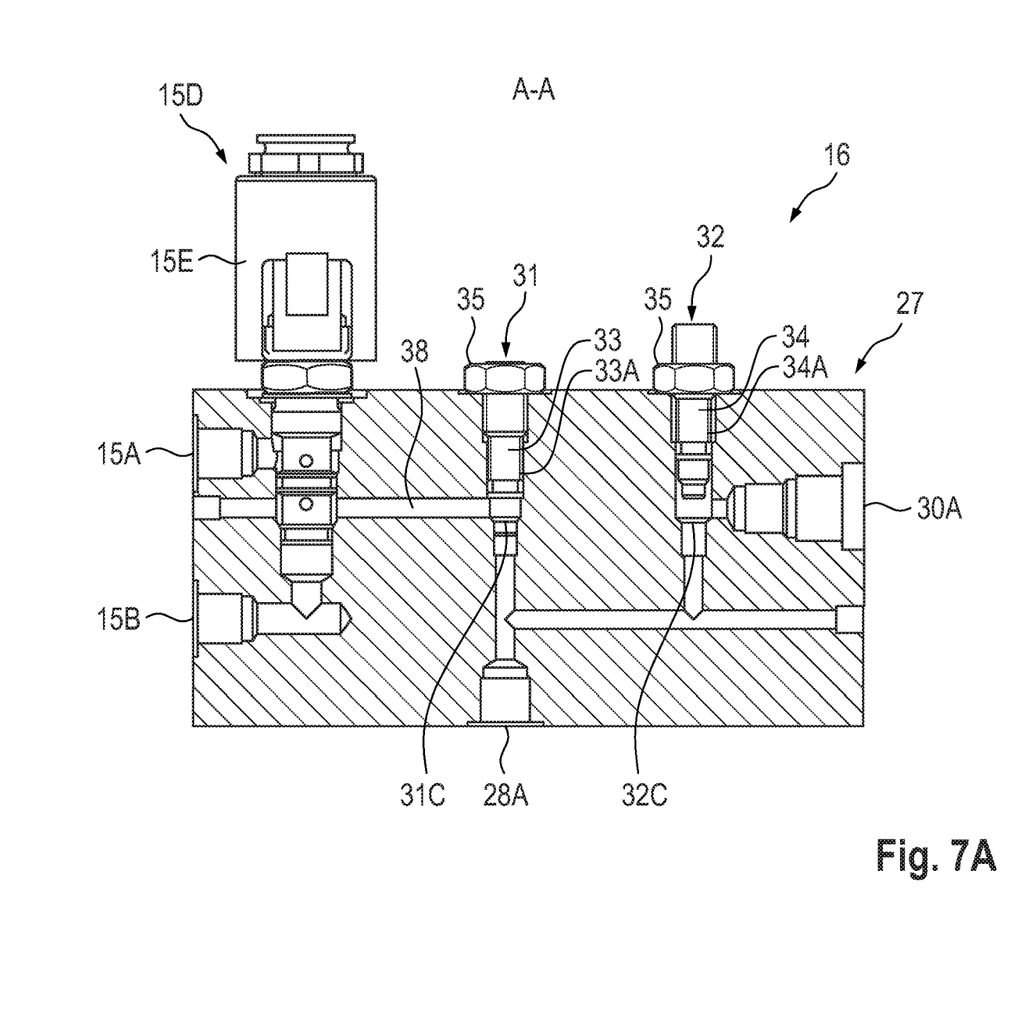
FIG. 7A shows the structural unit of the emergency-operation valve arrangement and braking device, the emergency-operation valve arrangement being in the emergency-operation position.
Figure 7B:
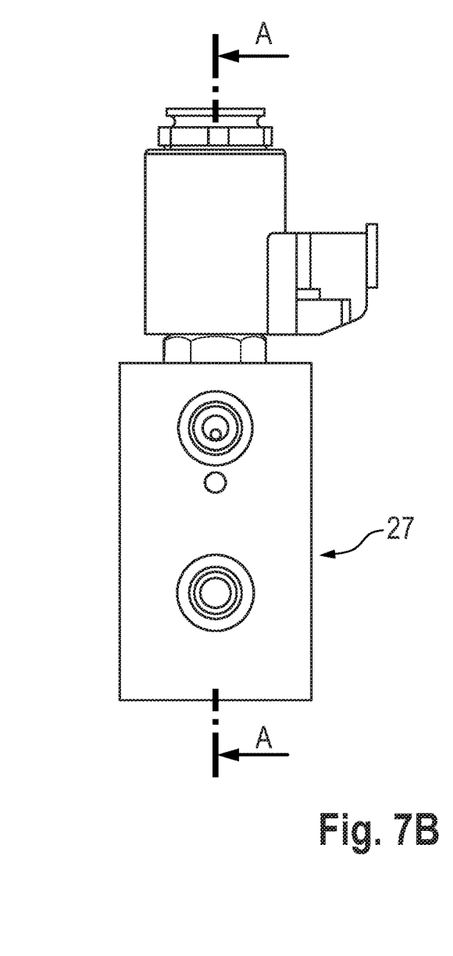
FIG. 7B is a lateral view of the structural unit of FIG. 7A.
Figure 8:
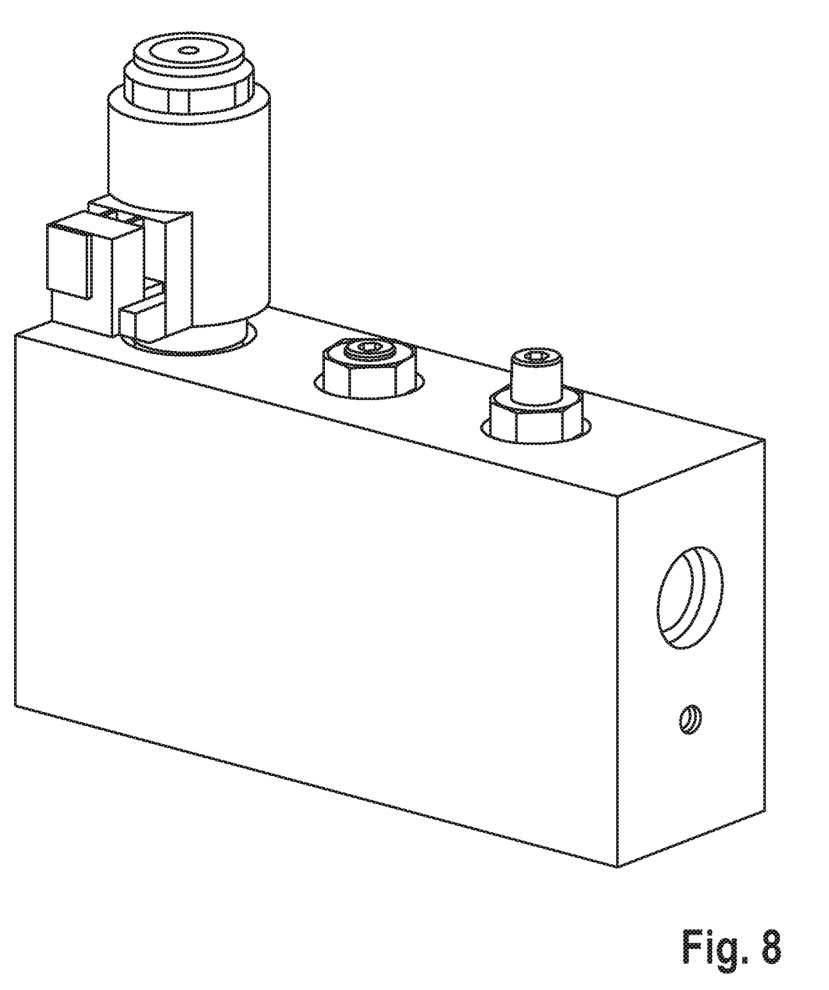
FIG. 8 is a perspective representation of the structural unit of FIG. 6A to 7B.

FIGS. 6A and 6B show a second embodiment of the emergency-operation valve arrangement 16 in the first switch position, and FIGS. 7A and 7B show the emergency-operation valve arrangement 16 in the second switch position (emergency operation mode). FIG. 8 is a perspective representation of the emergency-operation valve arrangement 16. The second embodiment differs from the first embodiment in that the multi-way valve 15 and the emergency-operation valve arrangement 16 form a structural unit. The corresponding parts are provided with the same reference signs.

The multi-way valve 15 and the emergency-operation valve arrangement 16 have a common valve block 27 which has the inlet port 15A and the outlet port 15B of the multi-way valve 15 as well as the work port 28A and the second inlet port 30A of the emergency-operation valve arrangement 16. The work port 15C of the multi-way valve 15 and the first inlet port 29A of the emergency-operation valve arrangement 16 are connected to a channel 38 formed in the valve block 27. The multi-way valve 15 has an electromagnetically actuated valve body 15D which is screwed into a bore 39 in the valve block 27. The actuator for the actuation of the multi-way valve 15 is located in a housing body 15E outside the valve block 27. The shut-off screws 31, 32 are screwed into bores 33, 34 of the valve block 27 which are provided with internal threads 33A, 34A.

FIGS. 6A and 6B show that, in the operating position, the first shut-off screw 31 is not seated on the first valve seat 31C, while the second shut-off screw 32 is seated on the second valve seat 32C. When the multi-way valve 15 is in the second switch position, hydraulic fluid can thus flow from the inlet port 15A through the valve block 27 to the work port 28A, which is in fluid connection with the pressure chambers 10A, 10B of the braking device actuating devices 10, 11, while the flow path to the steering device is shut off.

FIGS. 7A and 7B show that, in the operating position, the first shut-off screw 31 is seated on the first valve seat 31C, while the second shut-off screw 32 not on the second valve seat 32C (emergency operation). The hydraulic fluid can now flow from the inlet port 30A through the valve block 27 to the work port 28A, so that the brakes are released.

The invention claimed is:

1. A self-propelled construction machine, comprising:
a machine frame;
a plurality of running gears supporting the machine frame;
a braking system including at least one brake actuator associated with at least one of the running gears, the brake actuator including a pressure chamber configured to be acted upon with hydraulic fluid, the braking system being configured such that:
in a locking position of the braking system in which the pressure chamber of the brake actuator is not acted upon with hydraulic fluid, the associated running gear is braked; and
in an operating position of the braking system in which the pressure chamber of the brake actuator is acted upon with hydraulic fluid the associated running gear is unbraked;
a hydrostatic steering system including at least one steering actuator associated with at least one of the running gears, the steering actuator including a first and a second pressure chamber configured to be acted upon with hydraulic fluid, the steering system being configured such that when steering in one direction the first pressure chamber is acted upon with hydraulic fluid, and when steering in another direction the second pressure chamber is acted upon with hydraulic fluid, so that the running gear associated with the steering actuator executes a steering movement;
a hydraulic power supply system for the actuation of the brake actuator and the steering actuator, the hydraulic power supply system including a hydraulic source configured to provide hydraulic fluid to the brake actuator and the steering actuator, the hydraulic power supply system including a manually actuated emergency-operation valve arrangement, the manually actuated emergency-operation valve arrangement including:
a valve block including a first inlet port in fluid connection with the hydraulic source, a second inlet port in fluid connection with one of the first and second pressure chambers of the steering actuator, a work port in fluid connection with the pressure chamber of the brake actuator, a first flow path connecting the first inlet port to the work port, and a second flow path connecting the second inlet port to the work port;
a first shut-off screw configured to shut off the first flow path; and
a second shut-off screw configured to shut off the second flow path;
wherein in the event of a malfunction in the supply of hydraulic fluid by the hydraulic power supply system to the brake actuator, the first flow path can be manually shut off by the first shut-off screw and the second flow path can be manually opened by the second shut-off screw, such that a fluid connection is created between the steering actuator and the pressure chamber of the braking actuator so that during actuation of the steering actuator hydraulic fluid flows from the steering actuator to the pressure chamber of the braking actuator so that the braking system is moved to its operating position in which the associated running gear is unbraked.

2. The self-propelled construction machine of claim 1, wherein:
each of the first and second shut-off screws includes a screw head including a polygonal socket.

3. The self-propelled construction machine of claim 2, wherein:
each of the first and second shut-off screws includes an external thread on its screw head, and a lock nut screwed on the external thread.

4. The self-propelled construction machine of claim 1, wherein:
the valve block includes first and second threaded bores; and
the first and second shut-off screws are screwed into the first and second threaded bores, respectively.

5. The self-propelled construction machine of claim 1, wherein:
the steering actuator includes a double-acting hydraulic cylinder having the first and second pressure chambers.

6. The self-propelled construction machine of claim 5, further comprising:
a connecting flow path connecting the second inlet port to one of the first and second pressure chambers of the steering actuator; and
a non-return valve disposed in the connecting flow path, the non-return valve being open in a direction of the second inlet port.

7. The self-propelled construction machine of claim 1, wherein:
the hydraulic power supply system includes a multi-way valve having first and second switch positions, the multi-way valve being preloaded into the first switch position, the hydraulic power supply system being configured such that:

in the first switch position the pressure chamber of the braking actuator is not acted upon by hydraulic fluid so that the running gear is braked; and in the second switch position the pressure chamber of the braking actuator is acted upon by hydraulic fluid so that the running gear is unbraked.

8. The self-propelled construction machine of claim 7, wherein:

the multi-way valve is an electromagnetically controlled multi-way valve.

9. The self-propelled construction machine of claim 7, wherein:

the multi-way valve is mounted in the valve block of the emergency-operated valve arrangement so that the multi-way valve and the emergency-operated valve arrangement comprise a single structural unit.

10. The self-propelled construction machine of claim 1, wherein the hydraulic power supply system comprises:

a hydraulic fluid tank; and a hydraulic pump including a pressure port and a suction port, the suction port being in fluid connection with the hydraulic fluid tank.

11. The self-propelled construction machine of claim 10, wherein:

the hydrostatic steering system includes an inlet and an outlet, the inlet being in fluid connection with the pressure port of the hydraulic pump, and the outlet being in fluid connection with the hydraulic fluid tank.

12. The self-propelled construction machine of claim 11, wherein:

the hydraulic power supply system includes a three-port/two-position multi-way valve including an inlet port, an outlet port and a work port;

the inlet port of the multi-way valve is in fluid connection with the pressure port of the hydraulic pump;

the outlet port of the multi-way valve is in fluid connection with the hydraulic fluid tank; and the work port of the multi-way valve is in fluid connection with the first inlet port of the emergency-operation valve arrangement.

13. The self-propelled construction machine of claim 1, wherein:

the self-propelled construction machine is a road milling machine;

the plurality of running gears includes a front running gear, a rear left running gear, and a rear right running gear; and wherein the front running gear is a steerable running gear and the steering actuator is associated with the front running gear to steer the front running gear.

14. The self-propelled construction machine of claim 13, wherein:

the at least one brake actuator includes a first brake actuator associated with the rear left running gear, and a second brake actuator associated with the rear right running gear.

15. The self-propelled construction machine of claim 13, wherein:

each of the running gears includes a wheel.

\* \* \* \* \*